United States Patent
Vladuchick et al.

(10) Patent No.: US 9,595,409 B2
(45) Date of Patent: Mar. 14, 2017

(54) PARTICLE RESISTANT ENCLOSURE FOR DEAD TANK CIRCUIT BREAKER

(71) Applicant: ABB TECHNOLOGY AG, Zurich (CH)

(72) Inventors: Paul Vladuchick, Cranberry Township, PA (US); Matthew Cuppett, Uniontown, PA (US)

(73) Assignee: ABB SCHWEIZ AG, Baden (CH)

(*) Notice: Subject to any disclaimer, the term of this patent is extended or adjusted under 35 U.S.C. 154(b) by 20 days.

(21) Appl. No.: 14/795,121

(22) Filed: Jul. 9, 2015

(65) Prior Publication Data
US 2017/0011874 A1    Jan. 12, 2017

(51) Int. Cl.
*H01H 33/55* (2006.01)

(52) U.S. Cl.
CPC .................. *H01H 33/55* (2013.01)

(58) Field of Classification Search
CPC ............ H01H 33/56; H01H 2033/888; H01H 2205/002; H01H 33/7023; H01H 33/74; H01H 33/91; H01H 3/46; H01H 2033/908; H01H 2235/01; H01H 2239/036; H01H 31/02; H01H 33/008; H01H 33/022; H01H 33/04
See application file for complete search history.

(56) References Cited

U.S. PATENT DOCUMENTS

| | | | | |
|---|---|---|---|---|
| 3,941,963 A | * | 3/1976 | Sasaki .................... | H01H 33/56 218/63 |
| 5,012,051 A | * | 4/1991 | Tsukushi ............ | H02B 13/0352 218/71 |
| 5,304,762 A | * | 4/1994 | Hiltbrunner ......... | H01H 33/901 218/62 |
| 5,654,532 A | * | 8/1997 | Meyer .................... | H01H 33/91 218/51 |
| 5,750,949 A | * | 5/1998 | Rees ..................... | H01H 33/122 218/43 |

(Continued)

FOREIGN PATENT DOCUMENTS

| | | |
|---|---|---|
| JP | 2001016718 A | 1/2001 |
| WO | 0152293 A1 | 7/2001 |
| WO | 2005008856 A2 | 1/2005 |

OTHER PUBLICATIONS

International Search Report & Written Opinion in PCT/US2016/038621 dated Sep. 12, 2016.

*Primary Examiner* — Truc Nguyen
(74) *Attorney, Agent, or Firm* — Manelli Selter PLLC; Edward J. Stemberger

(57) ABSTRACT

A tank for a circuit breaker has a body defining an interior volume and having opposing ends. An flange is at each end of the body with the flanges defining a central longitudinal axis of the body. The body has an internal surface defining a top portion of the tank disposed substantially above the axis and defining a bottom portion of the tank disposed substantially below the axis. The top portion is spaced from the axis as defined by at least a first radius from the axis. The bottom portion is spaced from the axis as defined by at least a second radius from axis. The second radius is greater than the first radius so as to reduce an electric field intensity on the bottom portion of the body and thus reduce effects of foreign particles within the interior volume, regardless of phase rotation.

12 Claims, 3 Drawing Sheets

(56) References Cited

U.S. PATENT DOCUMENTS

| | | | |
|---|---|---|---|
| 6,624,370 B1* | 9/2003 | Soga | H01H 33/02 |
| | | | 218/154 |
| 2012/0138574 A1* | 6/2012 | Yamamoto | H01H 33/42 |
| | | | 218/140 |
| 2014/0110378 A1* | 4/2014 | Yeckley | H01H 33/53 |
| | | | 218/155 |

* cited by examiner

PARTICLE RESISTANT ENCLOSURE FOR DEAD TANK CIRCUIT BREAKER

FIELD

The embodiment relates to dead tank circuit breakers and, more particularly, to an enclosure of a dead tank circuit breaker that utilizes a variable internal tank geometry to reduce an electric field intensity on the bottom of the tank and thus reduce the effects of foreign particles in the tank.

BACKGROUND

Dead tank circuit breakers are commonly found in substations and are operable to selectively open and close electrical connections contained within a sealed tank filled with dielectric material for reducing arcing.

Despite careful manufacturing practices, an assembled circuit breaker can contain undesirable foreign particles such as metal shavings from machined parts, dirt, etc. It is undesirable for these particles, especially metallic, electrically conductive particles to reside in the tank since, if such particles are permitted to remain free in the tank, they could cause undue arcing, flashing, or can be electrically charged and radially reciprocate within the tank, reducing the breakdown voltage of the circuit breaker.

Particle traps have been developed for trapping these foreign particles. Conventional particle traps are configured in three ways: external, integrated and interrupter offset. External particle traps are components that are fixed to the bottom tank in some manner to shield particles in the bottom of the tank from the electric field. However, external particle traps are subject to manufacturing and assembly of the shield. Additionally, they typically shield a relatively small region. Also, multiple attachment locations of the traps in the tank are required in order to account for phase rotation.

Integrated particle traps are a cast feature and typically include a single trough (running radially), a single cup, or single trough (running lengthwise of the tank) used to catch particles. Cups and troughs are susceptible to the electrical field reaching into the protected area and generating activity. A trough running with the tank length can always permit the electric field to enter. There are ways to avoid the field from entering the cup and the radial trough, such as making the depth significantly deeper than the width. This is not possible on some dead tank circuit breakers due to height restrictions. Therefore, another method is to minimize the width of the trap such that the depth to width ratio is optimized. However, this method leads to a greater probability of particles not entering the integrated trap. Additionally, multiple troughs are typically needed to account for phase rotation, which increases the complexity of the tank.

Another method of controlling foreign particles in a circuit breaker tank is to offset the axis of an interrupter from the tank axis such that the distance between the interrupter and the tank is greatest on the bottom of the tank and smallest on the top of the tank. This method cannot completely account for phase rotation that must be compensated for in the configuration of the tank diameter. This configuration also requires changes to the mounting of the interrupter and other components to account for the required offset.

Thus, there is a need to provide a circuit breaker tank that is configured to reduce the effects of foreign particles in the electric field along the entire bottom of the tank regardless of phase rotation and without interrupter offset.

SUMMARY

An object of the invention is to fulfill the need referred to above. In accordance with the principles of an embodiment, this objective is obtained by providing a tank for a dead tank circuit breaker. The tank includes a body defining an interior volume and having opposing ends. An annular flange is at each end of the body with the flanges defining a central longitudinal axis of the body. The body has a substantially continuous internal surface defining a top portion of the tank disposed substantially above the central longitudinal axis and defining a bottom portion of the tank disposed substantially below the central longitudinal axis. The top portion is spaced from the central longitudinal axis as defined by at least a first radius from the central longitudinal axis. The bottom portion is spaced from the central longitudinal axis as defined by at least a second radius from central longitudinal axis. The second radius is greater than the first radius so as to reduce an electric field intensity on the bottom portion of the body and thus reduce effects of foreign particles within the interior volume, regardless of phase rotation.

In accordance with another aspect of an embodiment, a method of reducing effects of foreign particles in an electric field along a bottom of a tank of a circuit breaker provides a tank having a body. A substantially continuous internal surface of variable geometry is defined in the body such that when the circuit breaker is energized, an electric field in the tank is sufficiently weak so as to not cause foreign charged particles to levitate from the bottom regardless of phase rotation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
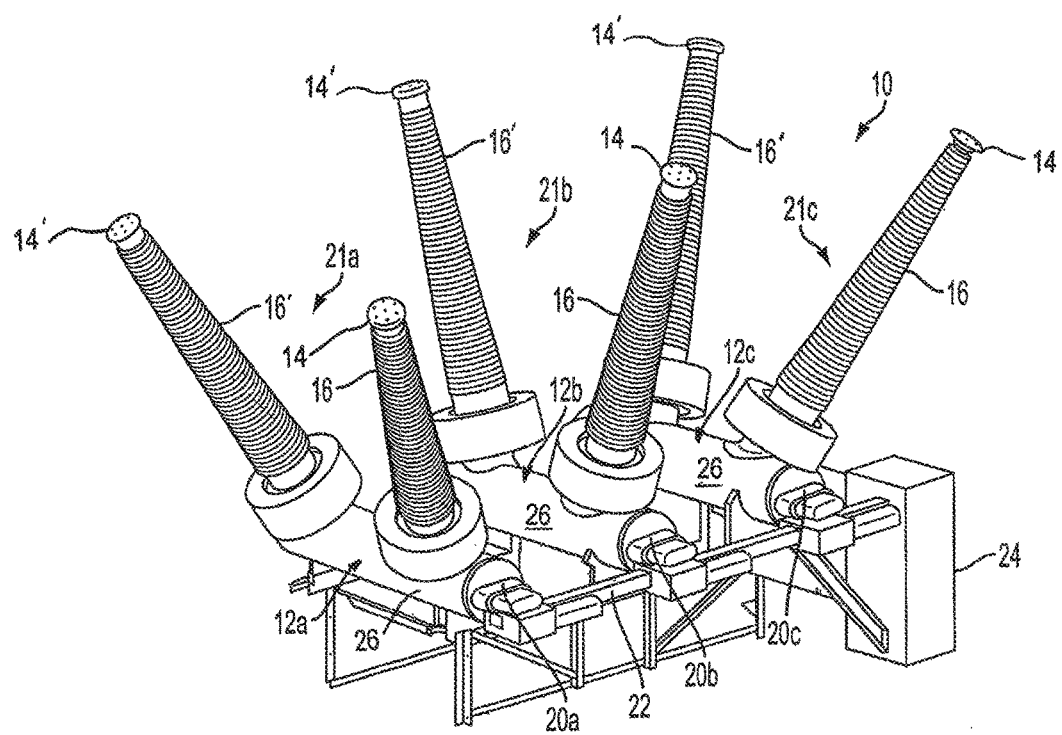
FIG. 1 is a front perspective view of a dead tank circuit breaker in accordance with an embodiment.

With reference to FIG. 1, a dead tank circuit breaker is shown, generally indicated at 10, in accordance with an embodiment. Circuit breaker 10 is a preferably a three phase circuit breaker, and thus includes three pole assemblies including outer pole assemblies 12*a* and 12*c* and a central pole assembly 12b. Each pole assembly includes a first electrical conductor 14 carried in a first bushing 16 and a second electrical conductor 14' carried in a second bushing 16'. As is known in the art, electrical power lines are coupled to the first and second electrical conductors, and the circuit breaker 10 selectively opens or closes the electrical connection there-between. A bell crank 20a, 20b, 20c, is associated with a respective pole assembly 12a, 12b and 12c. The bell cranks are interconnected by a gang-style linkage structure 22 including interconnecting shafts 23 so that all three poles assemblies are actuated at the same time by a single operating mechanism, generally indicated at 24. Each pole assembly 12a, 12b and 12c includes a tank 26 that houses the electrical contacts of the breaker 10. A bell crank is coupled to each tank. An interior volume 28 (FIG. 3) of each tank 26 may be filled with dielectric material that preferably includes SF6, dry air, dry nitrogen, $CO_2$ or oil to reduce arcing. The circuit breaker 10 of FIG. 1 is an example of a dead tank circuit breaker and instead of providing the gang-style linkage structure 22, the poles assemblies 12a, 12b and 12c can be independently operated. Also, the tanks 26 of pole assemblies 12a and 12c need not be rotated. The circuit breaker is preferably of the 72 kV up to 800 kV type.

Figure 2:
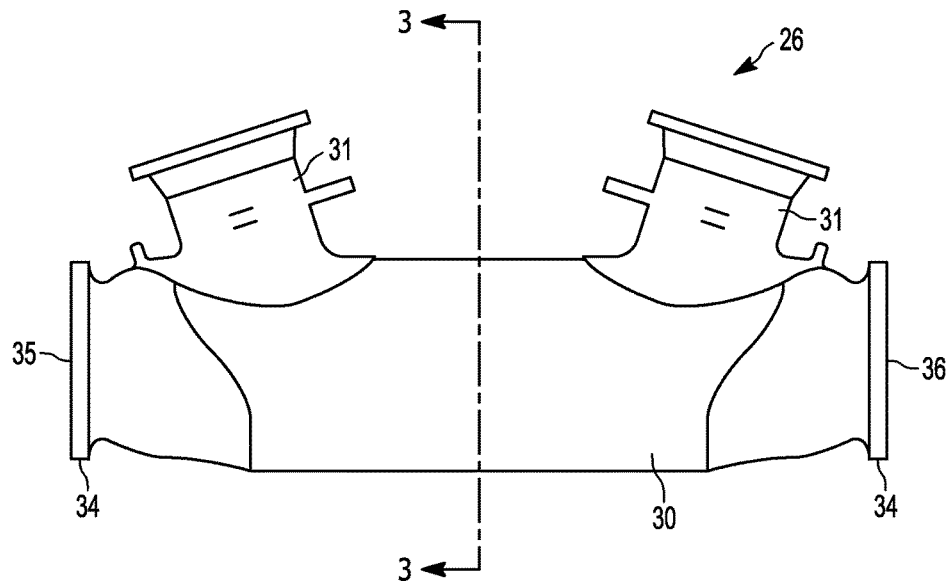
FIG. 2 is a side view of a tank of the dead tank circuit breaker of FIG. 1.
Figure 3:
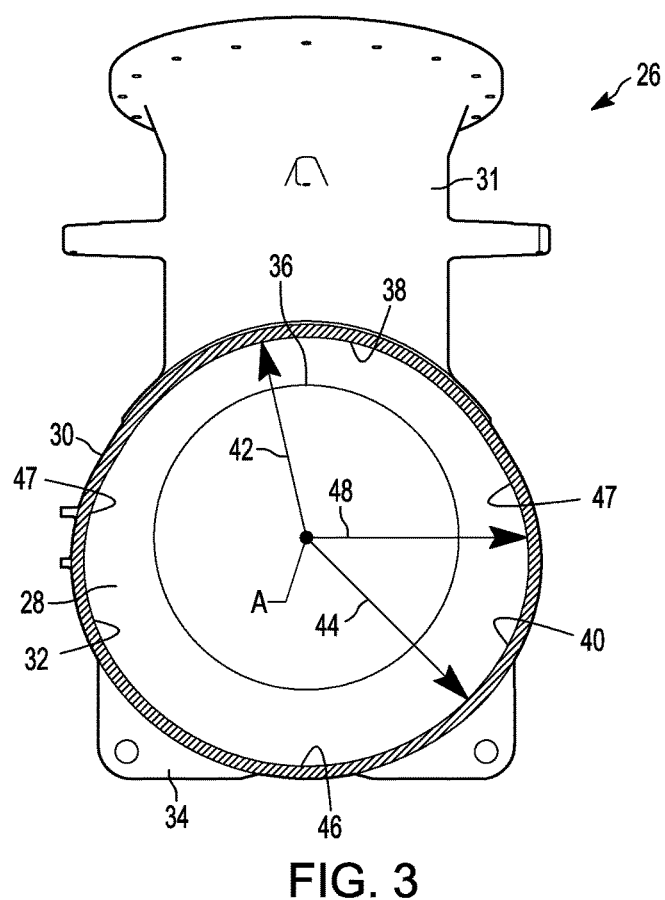
FIG. 3 is a cross-sectional view of the tank taken along the line 3-3 in FIG. 2.

With reference to FIG. 2, a side view of one of the tanks 26 is shown after removal of the bell crank 20a and bushings 16, 16' and FIG. 3 shows a cross-sectional view taken along the center line 3-3 in FIG. 2. The tank 26 includes a body 30 defining the interior volume 28. The body 30 includes a pair of bushing mounts 31 integral there-with and in communication with the interior volume 28. In accordance with the embodiment and as best shown in FIG. 3, the body 30 of the tank 26 has a substantially continuous internal surface 32 defined by a variable geometry. Each ends of the body 30 includes an annular flange 34 for mounting an end cover (not shown) for closing an opened end 35 and for mounting the bell crank 20a at the opposite end 36. The flanges 34 define a central longitudinal axis A of the body 30. Surface 32 defines a top portion 38 of the tank 26 disposed substantially above the central axis A and defines a bottom portion 40 of the tank 26 disposed substantially below the central axis A.

As shown in FIG. 3, the top portion 38 is spaced a distance from the central axis A defined by at least a first radius 42 from the central axis A. A dimension of the first radius 42 is based on impulse waveforms (voltage) criteria of the circuit breaker 10 such as the target tank and interrupter electric field gradient at basic impulse insulation level (BIL), or chopped wave, or other impulses, since foreign particles inside the tank 26 will not be present at the top portion 36 due to the effects of gravity. The bottom portion 40 is spaced from the central axis A defined by at least a second radius 44 from the central axis A. The second radius 44 is greater than the first radius 42. A dimension of the second radius 44 is based on target tank and interrupter electric field gradient at both power frequency and nominal system voltage (1 p.u. voltage) such that the electric field is sufficiently weak so as to not cause metallic or charged particles to levitate from near the bottom 46 of the tank leading to particle induced internal flashovers while the breaker is energized. In the embodiment, the top portion 38 comprises substantially the entire upper half of the body 30, while the bottom portion 40 comprises substantially the entire bottom half of the body 30. However, in certain applications, the bottom portion 40 can comprise only the portion near the bottom 46 of the body 30. The body 30 includes transition portions 47 that ensure that the top portion 38 and the bottom portion 40 mate in a smooth manner. The transition portions 47 are defined by transition radii 48 that are sized so as to be smaller than the second radius 44 but larger than the first radius 42. The transition radii 48 are configured to meet ASME code maximum limits for pressure.

Thus, the variable internal tank geometry reduces the electric field intensity on the bottom portion of the body 30, reducing the effects of foreign particles in the electric field along the entire bottom 46 of the tank 26 regardless of phase rotation. In the embodiment shown, the ratio of the first radius 42 to the second radius 44 is about 1:1.15. However, this ratio will change significantly in other circuit breaker configurations of different voltage levels, but the dimension of second radius 44 will always be greater than the dimension of the first radius 42, regardless of circuit breaker voltage level. The ratio of the first radius 42 to the second radius 44 can be based on test voltage levels, ASME maximum allowable anticipated pressure (design pressure), casting method and other design parameters.

Figure 4:
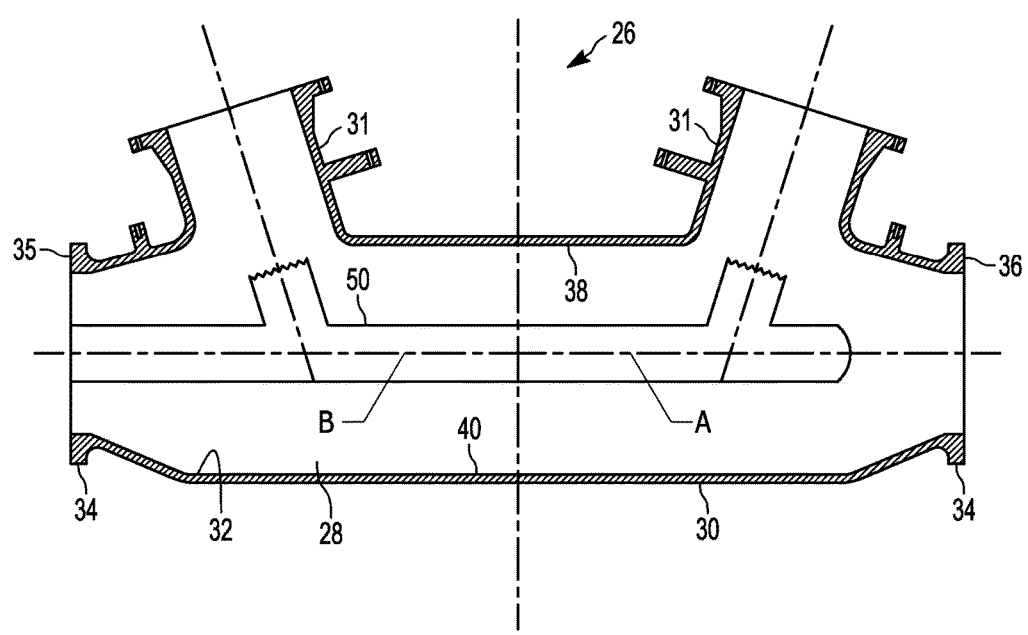
FIG. 4 is cross-sectional view of the tank of FIG. 1 showing an interrupter therein.

With reference to FIG. 4, one advantage of the tank 26 of the embodiment is that no offset of an axis of an interrupter 50 from the tank axis A is required to control foreign particles in the tank. Thus, a longitudinal axis B of the interrupter 46 is aligned with the axis A of the body 30. An example of such an interrupter is shown in U.S. Pat. No. 5,478,980, the content of which is hereby incorporated by reference into this specification. Another advantage of the tank 26 is that particle control in the tank can be achieved regardless of phase rotation.

Other benefits of the embodiment include:
1. Decreased sensitivity of foreign particles when circuit breaker is energized at power frequency and 1 p.u. voltages.
2. Minimized tank overall diameter
3. Minimized gas volume 28 in regard to resultant electric field intensity on the tank surface
4. Easily applied ASME code to critical regions of tank
5. Backwards compatible to existing bell cranks, end covers, etc.
6. Backwards compatible to existing frames and shipping structures.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:
1. A tank for a circuit breaker, the tank comprising:
an integral body defining an interior volume and having opposing ends, and
an annular flange at each end of the body, the flanges defining a central longitudinal axis of the body,
wherein the body has a substantially continuous internal surface defining a top portion of the tank disposed substantially above the central longitudinal axis and in an upper half of the body and the body defining a bottom portion of the tank disposed substantially below the central longitudinal axis and in a bottom half of the body, the top portion being spaced from the central axis as defined by at least a first radius from the central longitudinal axis, and the bottom portion is spaced from the central axis as defined by at least a second radius from central longitudinal axis, with the second radius being greater than the first radius so as to reduce an electric field intensity on the bottom portion of the body and thus reduce effects of foreign particles within the interior volume, regardless of phase rotation, wherein the body includes transition portions defining a smooth transition between the top portion and the bottom portion, each transition portion being defined by transition radii that are sized so that the first and second radii blend smoothly and wherein each transition portion extends into the upper half of the body.

2. The tank of claim 1, wherein a dimension of the first radius is based on an impulse voltage of the circuit breaker and a dimension of the second radius is based on power frequency and nominal system voltage such that when the circuit breaker is energized, an electric field in the tank is sufficiently weak so as to not cause foreign charged particles to levitate from the bottom portion of the body.

3. The tank of claim 2, wherein impulse voltage is BIL or chopped wave.

4. The tank of claim 2, wherein the nominal voltage is 1 p.u. line to ground voltage of the circuit breaker.

5. The tank of claim 1, wherein the body further includes a pair of bushing mounts integral there-with and in communication with the interior volume.

6. The tank of claim 1, further comprising an interrupter disposed in the interior volume and having a longitudinal axis that is aligned with the central longitudinal axis.

7. A dead tank circuit breaker comprising:
a plurality of pole assemblies, each pole assembly including a first electrical conductor carried in a first bushing and a second electrical conductor carried in a second bushing, each pole assembly including a tank, and
a bell crank coupled to each tank,
wherein each tank comprises:
an integral body defining an interior volume and having opposing ends, and
an annular flange at each end of the body, the flanges defining a central longitudinal axis of the body,
wherein the body has a substantially continuous internal surface defining a top portion of the tank disposed substantially above the central longitudinal axis and in an upper half of the body and the body defining a bottom portion of the tank disposed substantially below the central longitudinal axis and in a bottom half of the body, the top portion being spaced from the central longitudinal axis as defined by at least a first radius from the central longitudinal axis, and the bottom portion is spaced from the central longitudinal axis as defined by at least a second radius from central longitudinal axis, with the second radius being greater than the first radius so as to reduce an electric field intensity on the bottom portion of the body and thus reduce effects of foreign particles within the interior volume, regardless of phase rotation,
wherein the body includes transition portions defining a smooth transition between the top portion and the bottom portion, each transition portion being defined by transition radii that are sized so that the first and second radii blend smoothly and wherein each transition portion extends into the upper half of the body.

8. The circuit breaker of claim 7, wherein a dimension of the first radius is based on an impulse voltage of the circuit breaker and a dimension of the second radius is based on power frequency and nominal system voltage such that when the circuit breaker is energized, an electric field in the tank is sufficiently weak so as to not cause foreign charged particles to levitate from the bottom portion of the body.

9. The circuit breaker of claim 8, wherein impulse voltage is BIL or chopped wave.

10. The circuit breaker of claim 8, wherein the nominal voltage is 1 p.u. line to ground voltage of the circuit breaker.

11. The circuit breaker of claim 7, wherein the body further includes a pair of bushing mounts integral there-with and in communication with the interior volume.

12. The circuit breaker of claim 7, further comprising an interrupter disposed in the interior volume and having a longitudinal axis that is aligned with the central longitudinal axis.

* * * * *